United States Patent
Franz et al.

(10) Patent No.: US 9,250,937 B1
(45) Date of Patent: Feb. 2, 2016

(54) CODE RANDOMIZATION FOR JUST-IN-TIME COMPILERS

(71) Applicant: The Regents of the University of California, Oakland, CA (US)

(72) Inventors: Michael Franz, Irvine, CA (US);
Andrei Homescu, Irvine, CA (US);
Stefan Brunthaler, Irvine, CA (US);
Per Larsen, Irvine, CA (US)

(73) Assignee: The Regents Of The University Of California, Oakland, CA (US)

( * ) Notice: Subject to any disclaimer, the term of this patent is extended or adjusted under 35 U.S.C. 154(b) by 0 days.

(21) Appl. No.: 14/535,319

(22) Filed: Nov. 6, 2014

Related U.S. Application Data

(60) Provisional application No. 61/900,956, filed on Nov. 6, 2013.

(51) Int. Cl.
*G06F 9/455* (2006.01)
*G06F 21/51* (2013.01)

(52) U.S. Cl.
CPC ............ *G06F 9/45516* (2013.01); *G06F 21/51* (2013.01)

(58) Field of Classification Search
USPC .................. 717/140–143, 146–148, 150–151
IPC .................................... G06F 8/41,8/53, 9/45516
See application file for complete search history.

(56) References Cited

U.S. PATENT DOCUMENTS

| | | | |
|---|---|---|---|
| 6,463,521 B1 * | 10/2002 | Long .................. G06F 9/30145 712/209 |
| 6,536,037 B1 * | 3/2003 | Guheen ..................... G06F 8/71 703/2 |
| 6,836,884 B1 * | 12/2004 | Evans ................. G06F 11/3664 714/E11.21 |
| 6,968,546 B2 * | 11/2005 | Lueh .................... G06F 9/45516 714/E11.209 |
| 6,993,751 B2 * | 1/2006 | Bhansali .................... G06F 8/44 717/137 |
| 7,089,540 B2 * | 8/2006 | Ogasawara .................... 717/140 |
| 7,305,666 B2 * | 12/2007 | Burger et al. ................. 717/140 |
| 7,587,712 B2 * | 9/2009 | Mountain ............. H04W 8/245 709/203 |
| 7,665,077 B2 * | 2/2010 | Mariani ............. G06F 9/44563 717/140 |
| 7,694,285 B2 * | 4/2010 | Meijer ...................... G06F 8/31 717/141 |
| 7,707,566 B2 * | 4/2010 | Grover et al. ................. 717/148 |
| 7,725,885 B1 * | 5/2010 | Pradhan et al. ............... 717/148 |
| 7,730,465 B2 * | 6/2010 | Sutter et al. .................... 717/141 |
| 7,873,943 B2 * | 1/2011 | Wu et al. ........................ 717/114 |
| 8,505,002 B2 * | 8/2013 | Yehia .................. G06F 9/30036 717/140 |
| 8,522,222 B2 * | 8/2013 | Tillmann ...................... 717/148 |
| 8,533,699 B2 * | 9/2013 | Moir ....................... G06F 9/467 717/151 |
| 8,584,109 B2 * | 11/2013 | Anckaert ................ G06F 21/53 712/226 |
| 8,955,142 B2 * | 2/2015 | Blaisdell et al. ................ 726/26 |
| 8,972,952 B2 * | 3/2015 | Pizlo et al. ..................... 717/128 |

OTHER PUBLICATIONS

Ding et al, "Finding the Limit: Examining the Potential and Complexity of Compilation Scheduling for JIT-Based Runtime Systems", ACM, pp. 607-621, 2014.*

(Continued)

*Primary Examiner* — Anil Khatri
(74) *Attorney, Agent, or Firm* — Klein, O'Neill & Singh, LLP

(57) ABSTRACT

A system-wide service can simultaneously harden multiple running JITs, for example by hooking into the memory protections of a target operating system and randomizing newly generated code on the fly when marked as executable. Some embodiments preserve the contents of the calling stack, presenting each JIT with the illusion that it is executing its own generated code.

19 Claims, 11 Drawing Sheets

(56) References Cited

OTHER PUBLICATIONS

Inoue et al, "Adaptive Multi-Level Compilation in a Trace-based Java JIT Compiler", ACM, pp. ACM pp. 179-193, 2012.*
Chang et al, "The Impact of Optional Type Information on JIT Compilation of Dynamically Typed Languages", ACM, pp. 13-24, 2011.*
Jantz et al, "Performance Potential of Optimization Phase Selection During Dynamic JIT Compilation", ACM, pp. 131-141, 2013.*
Jucovschi et al, "Speeding up Array Query Processing by Just-In-Time Compilation", IEEE, pp. 408-413, 2008.*
Sidiropoulos et al, "On Supporting Efficient Partial Reconfiguration with Just-In-Time Compilation", IEEE, pp. 328-335, 2012.*

* cited by examiner

```
        Undiversified                    Diversified

@0x123456   foo:              @0xABCDEF   foo':
                _                             _
    @0x123784   CALL bar  <-------------- PUSH 0x123789
    @0x123789   _                             JMP bar'
                                              _

@0x345678   bar:              @0xBCDEF0   bar':
                _                             _
```

FIG. 6

| Function | Description |
| --- | --- |
| rando_redirect(addr) | Diversifies (if needed) the code starting at addr and returns the diversified address |
| rando_hash_return() | Checks the return address of the current function and replaces it with the diversified equivalent |

Table 2: Application Programming Interface provided by librando.

FIG. 11

CODE RANDOMIZATION FOR JUST-IN-TIME COMPILERS

CROSS REFERENCE TO RELATED APPLICATIONS

This application claims the benefit of the filing of U.S. Provisional Patent Application No. 61/900,956, filed on Nov. 6, 2013, the disclosure of which is incorporated by reference herein.

FEDERALLY SPONSORED RESEARCH OR DEVELOPMENT

This invention was made with Government support under Contract No. D11PC20024, awarded by the Defense Advanced Research Projects Agency. The Government has certain rights in this invention.

BACKGROUND OF THE INVENTION

The present invention relates generally to protection of software programs, and more particularly to protection of just-in-time compiled code.

A just-in-time (JIT) compiler transforms a program written in a high-level language (HLL), generating native code at program run-time. The compiler emits native code into a code cache, after parsing and optimizing high level language (HLL) source code. The compiler itself is written in another programming language, which may be called the host language. JIT compilers also contain a language runtime, which is a library of functions that are written in the host language and provide or manage access to system resources. Some examples of such resources are files, networks, operating system threads and complex data structures (maps, trees). When compiling a HLL program, the JIT compiler emits native calls into the runtime whenever the program uses these resources. FIG. 5 shows a high-level structure of a JIT compiler 511 and its interactions with the generated code, which is written into an executable portion of memory 513. After emitting all or part of the native code (usually enough code to start execution of the program), the compiler branches to an entry point 515 of the HLL program. The generated code continues execution, calling into other generated functions or the language runtime. The HLL program continues until termination, making repeated calls into the runtime whenever needed.

From a security point of view, JIT compilers have one characteristic that is important in our context: predictability. As JIT compilers usually optimize code for performance, there are only a few optimal translations of HLL code to native code, and a JIT compiler emits one of these.

Our computing infrastructure depends on high performance delivered by just-in-time (JIT) compilers to a large degree. Efficiently executing JavaScript is generally a prerequisite for complex Web 2.0 applications. Similarly, Java's success rests on performance delivered by efficient dynamic code generation. From the early beginnings, JIT compilers had to focus on producing code quickly. Usually, they achieve this by optimizing the common case and forgoing time-intensive optimizations altogether. As a result, this leads to highly predictable code generation, which attackers exploit for malicious purposes. This is evidenced by the rising threats of JIT spraying and similar attacks on sandboxes in JITs. The former is particularly interesting: JIT spraying relies on JIT compilers emitting constants present in input source code directly into binary code. Due to variable length encoding, attackers can encode and subsequently divert control flow to arbitrary malicious code arranged this way.

This attack vector is innate and specific to JIT compilers. From a security perspective, the state-of-the-art in the field is to address JIT spraying by encrypting and decrypting constants. This addresses the code injection part of JIT spraying, but attackers can fall back on code-reuse techniques. Specifically, return-oriented programming for JIT compiled code is also problematic. Instead of finding gadgets in statically generated code (as they would do an a generic return-oriented programming attack), an attacker uses the JIT compiler to create new binary code containing the necessary gadgets by supplying specially crafted source code. The ubiquity of JIT compilers amplifies this security risk to such a degree that JITs become a liability.

When presented with the same HLL code many times repeatedly, a compiler will emit the same native code; attackers can use this characteristic to their advantage. This is not a problem specific to JIT compilers, but compilers in general; however, predictability of JIT compilers has not been fully explored.

JIT spraying is one recent attack that relies on predictability of JIT compilers. This attack is a form of code injection targeted at dynamically generated code. In its original form, it relies on one unintended behavior of many JIT compilers: HLL program constants reach native code unmodified, therefore becoming part of the executable code. The attacker injects short sequences (32-bit constants in the original paper), and later jumps to the injected sequence through a separate attack vector. For the attack to work, the attacker must also predict the remaining bytes inserted between the controlled sequences, and use those bytes as part of the payload; this is often possible in practice, due to the predictability of the compiler. This allows the attacker to execute arbitrary native code, even when running on a compiler that runs the generated code in a sandbox (with restricted access to memory, for example).

For many years, most arbitrary code execution attacks used the same method of gaining control of the program: code injection attacks. To prevent these, most operating systems now forbid the same page to be both writable and executable at the same time. Sidestepping this measure, a new class of attacks against applications surfaced and gained popularity: code reuse attacks. Instead of adding new executable code to an application, code reuse attacks locate reusable code sequences inside the application, then thread these sequences into a program written by the attacker. Shacham described one of the first versions of this attack, called Return-Oriented Programming (ROP); he named the code sequences gadgets. A gadget is simply a valid sequence of binary code that the attacker can execute successfully (the gadget decodes correctly and does not contain invalid instructions); a gadget can start anywhere inside the generated code (including in the middle of a proper instruction) and spans one or more of the original instructions emitted by the compiler. ROP uses only gadgets that end in a RET instruction (encoded by the C3 byte on x86); the attacker places addresses of gadgets on the stack on consecutive stack slots, so that each gadget proceeds to the next one using a return. Later work extends this idea to other indirect branch instructions.

This attack is even more potent in the presence of a JIT compiler, as an attacker that controls HLL code can emit an arbitrary amount of native code containing gadgets (by emitting as much HLL code as needed to generate all the gadgets for the attack). For example, this can be a problem for web browsers that include a JavaScript compiler, as many web pages include JavaScript code from unreliable (or hostile)

sources. Another problem is that current anti-ROP defenses target ahead-of-time compilers or binary rewriters, but do not offer protection to dynamically generated code.

Recent work addresses code-reuse attacks by attacking its foundation: the software monoculture. By diversifying the binary code, attackers cannot construct reliable attack code, because the binary code layout differs for each end-user. Consequently, diversity increases the costs for attackers, ultimately rendering them too costly. Unfortunately, existing approaches to artificial software diversity do not protect dynamically emitted code from a just-in-time compiler.

BRIEF SUMMARY OF THE INVENTION

Aspects of the invention provide a technique, fully automatic in some embodiments, to diversify existing JIT compilers in a black-box fashion. Aspects of the invention also provide a technique to diversify existing JIT compilers in a white-box fashion. The black-box approach may have an advantage over a white-box solution where diversification is added directly to JIT compiler source code—of not requiring duplicated work for existing JIT compilers. Besides the obvious savings in implementation time, the black-box approach allows for faster time-to-market for patches, without having to rely on vendors to supply patches to known vulnerabilities. Another benefit may be the added security for legacy JIT compilers available only in binary form, where extra defenses cannot be added by changing the source code.

Some aspects of the invention include or provide an automated software diversity solution, which may be termed "librando," for hardening existing JIT compilers, for example in a black box fashion. Some embodiments implement two popular defensive techniques: NOP insertion and constant blinding. In many embodiments librando executes on a processor also executing the JIT, although in various embodiments librando may execute on another processor of a device or system including the processor executing the JIT. In some embodiments two optimizations (for example the Return Address Map and optional white box diversification—taking advantage of compiler cooperation) improve the performance of librando. An embodiment of librando successfully protects HotSpot (a JIT compiler for Java—a statically-typed language) with an overhead of 15% and V8 (a JIT compiler for JavaScript—a dynamically-typed language) with a slowdown of 3.5 times.

One aspect of the invention provides a processor-implemented method useful in hardening just-in-time compilers (JITs), comprising: receiving emitted dynamically generated code from a JIT compiler; preventing execution of the emitted dynamically generated code; disassembling at least some bytes of the dynamically generated code; diversifying at least some basic blocks of the dynamically generated code; and writing the diversified basic blocks to an executable area of memory.

Another aspect of the invention provides a non-transitory computer readable medium including program instructions which configure a processor to: disassemble at least some bytes of dynamically generated code emitted by a just-in-time (JIT) compiler executing on the processor; generate a control flow graph based on the disassembled bytes; diversifying basic blocks present in the control flow graph; and writing the diversified basic blocks to executable memory.

Various embodiments of, aspects of, and variations of librando and the invention are more fully comprehended upon review of this disclosure.

BRIEF DESCRIPTION OF THE FIGURES

FIG. 6 illustrates rewriting of the CALL instruction.

FIG. 11 shows a table with API information.

DETAILED DESCRIPTION

Embodiments of the invention diversify code generated by a JIT compiler. Some embodiments of the invention read code emitted by the compiler, dissassembles the code, randomizes it, and then writes the randomized output to memory. In various embodiments a library, which may be termed "librando" herein, diversifies dynamically-generated code under a black box diversification model or a white box diversification model.

Figure 1:
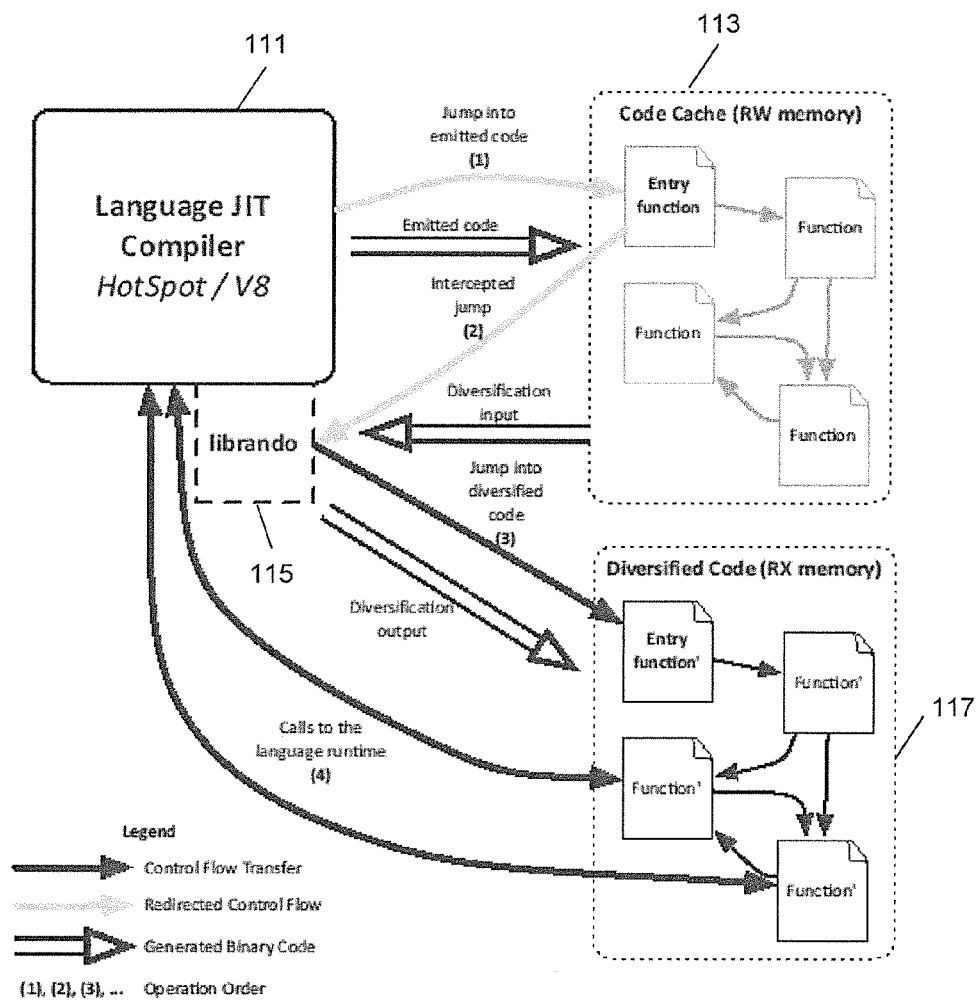
FIG. 1 is a semi-block diagram of an embodiment of a system in accordance with aspects of the invention.

FIG. 1 is a semi-block diagram of an embodiment of a system in accordance with aspects of the invention. A JIT compiler 111, for example executing on a processor, emits code. The emitted code is stored in a code cache 113 in memory. A library 115, also executing on the processor, also receives at least some of the emitted code, and in some embodiments all of the emitted code. The library generates diversified code based on at least some of the emitted code, and provides the diversified emitted code in a diversified code cache 117. The library also sets the code cache to be non-executable memory, with the diversified code cache being set to be executable memory. Attempts to execute the emitted code in the code cache are redirected to instead execute the diversified code in the diversified code cache.

Figure 2:
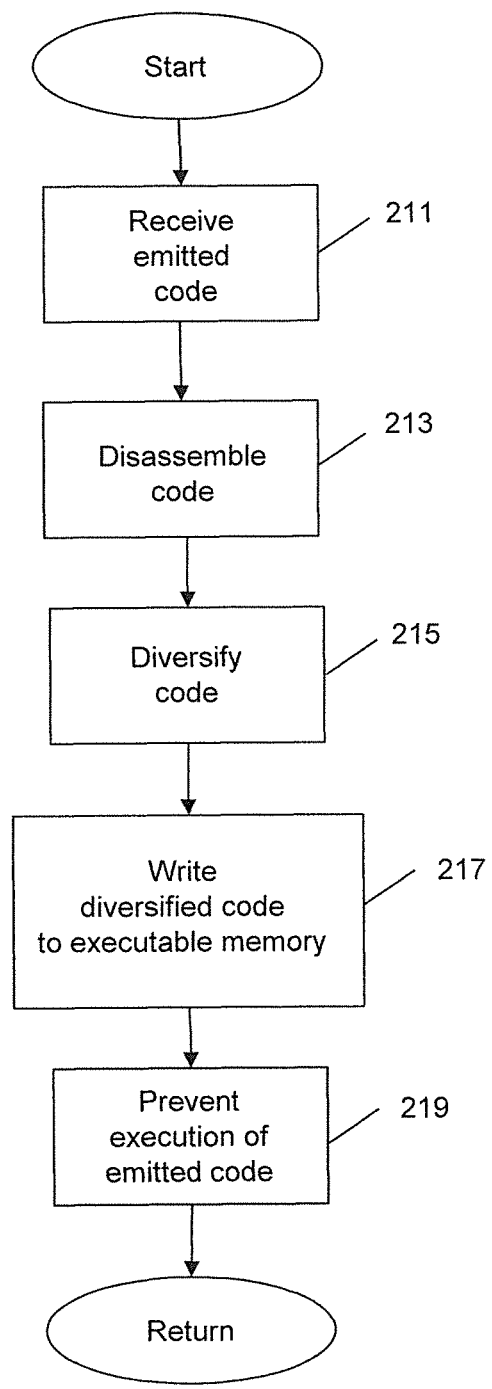
FIG. 2 is a flow diagram of a process in accordance with aspects of the invention.

FIG. 2 is a flow diagram of a process in accordance with aspects of the invention. The process of FIG. 2 may be performed, for example, by a processor, for example a processor of a computer device. In some embodiments the process is performed by the library of FIG. 1 executing on a processor. In block 211 the process receives emitted code. The emitted code is emitted, for example, by a JIT compiler. In block 213 the process disassembles the emitted code. In block 215 the process diversifies the emitted code. In block 217 the process writes the diversified code to executable memory. In block 219 the process prevents execution of the emitted code, for example by setting memory to which the emitted code may be written to a non-executable state. In various embodiments the process may perform the operation of block 219 at other times than as shown in FIG. 2, for example prior to receiving emitted code or prior to writing the diversified code to memory, or at other times.

Black box diversification diversifies dynamically-generated code with no assistance from the compiler (the compiler is a black box and the library has no knowledge of compiler internals). The library attaches to the compiler and intercepts all branches into and out of dynamically-generated code, without requiring any changes to compiler internals.

Figure 3:
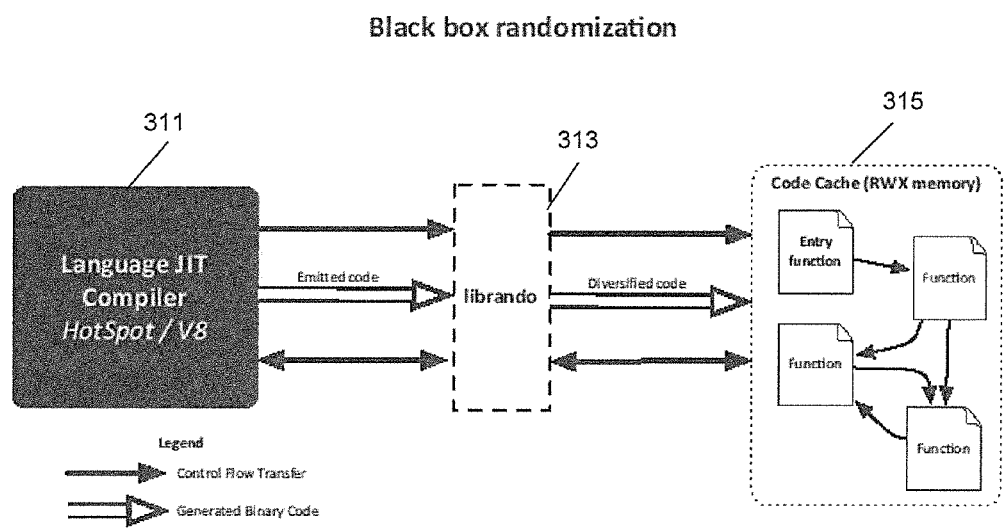
FIG. 3 shows a block diagram representation of black box diversification operation.

FIG. 3 shows a block diagram representation of black box diversification operation. A JIT compiler 311 emits code. A library 313 receives the emitted code and generates diversified code based on the emitted code. In various embodiments the library disassembles the emitted code in generating the diversified code. The diversified code is written in executable memory 315 for execution.

Figure 4:
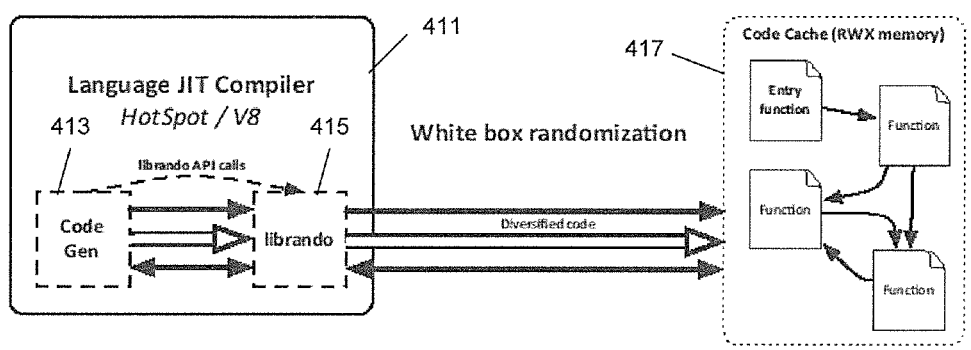
FIG. 4 shows a block diagram representation of white box diversification operation.
Figure 5:
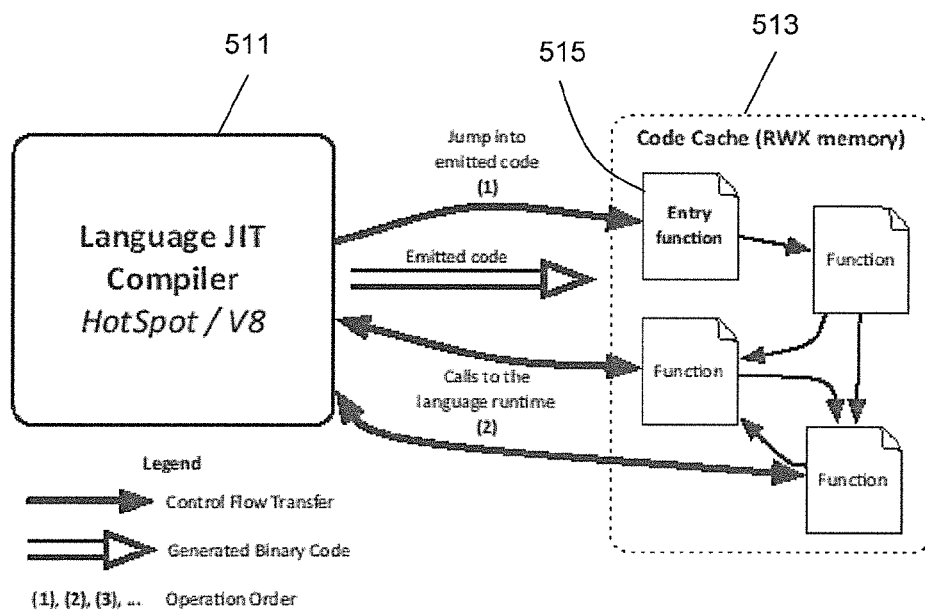
FIG. 5 shows a high-level structure of a JIT compiler and its interactions with the generated code.

White box diversification diversifies dynamically-generated code with some assistance from the compiler (the library has some knowledge of compiler internals). As shown in FIG. 4, a code emitter, shown as a code generator 413 of a JIT compiler 411, notifies a library, shown as librando 415, through an API when it starts running undiversified code. The library generates diversified code which is written to an executable code cache 417. The library provides the diversified code addresses to the compiler, and the compiler executes diversified code directly. All compiler branches into emitted code are changed to use the addresses returned by librando. This approach is intended as a middle ground between the previous model and a manual implementation of randomization for each compiler, and it generally requires that compiler source code is available.

As a first security measure, librando prevents execution of code generated dynamically by the compiler. Instead, the library disassembles the code into a control flow graph, diversifies basic blocks in this graph, and then writes the diversified blocks to a separate executable area. Branches (including function calls and returns) to the original undiversified code are redirected the diversified code. The diversified code may, for example, be the emitted code modified to include, and account for, additional no operation (NOP) instructions within the emitted code. While the undiversified code remains available and writable, the compiler or HLL program cannot execute it anymore. The library intercepts memory allocation functions (for example the mmap function family on Linux) that return executable memory, then removes the executable flag on all intercepted allocation requests. The library also keeps an internal list of all memory allocated by these requests, and uses this list to distinguish between accesses to undiversified code and all other memory accesses.

In the black box diversification model, the library transparently intercepts all branches protected blocks. To do this, all undiversified code pages are protected against execution, and attempts to execute these protected pages are caught. The library installs a handler for the segmentation fault signal (SIGSEGV in Linux), which is raised whenever a processor instruction attempts to access memory it does not have permission for. Whenever the processor attempts to execute a non-executable page, it triggers a page fault in the MMU. The operating system handles this fault and calls the SIGSEGV signal handler. The library then redirects execution to diversified code.

While static disassembly of binary code accurately is generally impossible in the general case (due to the need to distinguish code from data), dynamic disassembly is much simpler for one reason: disassembly of bytes that are certain to represent code is performed. The use of signals may guarantee this: the signal handler is generally always called when the JIT compiler executes an undiversified instruction at some address, so the bytes at that address (and the entire block starting at that address) are guaranteed to be code. The same is true for all blocks in the control flow graph containing that instruction, with direct branches followed to find more code.

In some embodiments, a few simplifying assumptions are made about the emitted code that reduces implementation effort significantly.

Some embodiments assume no stack pointer reuse. On the x86 architecture, the stack pointer register RSP is available as a general-purpose register. The x86 64-bit ABI reserves this register for its intended purpose, as a stack register. However, compilers only need to follow the ABI when calling into external libraries and system code; they can ignore its guidelines inside emitted code. Code emitted by a JIT compiler might use another register to keep track of the HLL stack, and re-use RSP for another purpose. Generally, JIT compilers do not do this in practice, so some embodiments assume that this register always points to the top of a valid native stack. This allows both code emitted by the compiler and by librando to use several stack manipulation instructions, such as PUSH, CALL and RET.

Some embodiments presume no self-modifying code. While it is possible for a JIT compiler to emit code that modifies itself, this is usually not the case. In most embodiments it is assumed that only the compiler can modify code. Once emitted code starts executing, it remains unchanged. This assumption simplifies implementation, as only code changes originating in the compiler itself are detected; therefore, old versions of modified code may be safely discarded, without the risk of having to continue execution inside discarded code.

Some embodiments presume calls are paired with returns. Compilers often use the CALL x86 instruction for calls and RET for the corresponding returns, but not always. The former pushes the return address on the native stack and branches to a function, while the latter pops the return address and branches to it. There are equivalent instruction sequences with the same behavior which a compiler can use instead, perhaps to push/pop the return address to another stack. However, there is a performance penalty from using these sequences, as modern processors use an internal return address stack to improve branch prediction for CALL/RET pairs, and only for those pairs. A compiler optimized for performance generally always uses this combination for function calls, which simplifies some implementations. Consequently, in some embodiments librando only analyzes and rewrites these instructions when redirecting function calls.

In some embodiments, code is diversified by relocating emitted code blocks, rewriting the code, and inserting instructions. To preserve HLL program semantics, a diversification library preferably is transparent to both the compiler and the compiled program. In some embodiments several pieces of program state are preserved when rewriting code.

In some embodiments processor register contents including the flags register are preserved. The library inserts instructions that hold intermediate values in registers. Also, some inserted instructions (like ADD and XOR) modify the processor flags register. The library attempts to only add instructions that do not change any registers or flags; where this is not possible, it temporarily saves the register(s) to the stack, performs the computation, then restores the register(s).

In some embodiments native stack contents are preserved. Some JIT compilers use the native stack for HLL code, while others switch to a separate stack when branching to HLL code. To support the former, the library preserves contents, and in some embodiments all content, of the native stack inside diversified code. In such embodiments this must be true not only during execution of dynamically generated code, but also during calls into the runtime, as the runtime itself may read or write to the native stack. For example, the V8 runtime walks the native stack during garbage collection to find all pointers to data and code. Changing any such pointer or any other data on the stack leads to program errors and crashes. Therefore, native stack contents preferably are identical when running with and without librando. This includes return addresses; when a diversified function calls another diversified function, the former pushes the undiversified address on the stack. FIG. 6 illustrates this transformation. The original call pushes the address of the next instruction on the stack, then jumps to the called function. As illustrated it replaced with a PUSH/JMP pair that pushes the undiversified return address. There is one exception to this restriction: any memory past the top of the stack (below RSP) may be considered to be unused, so it may be used to save registers.

In some embodiments undiversified code instructions are preserved. JIT compilers frequently emit code with temporary placeholders, then later replace them with other instructions. The compiler usually uses fixed instruction sequences for these placeholders, so it first checks their contents before patching. In other cases, certain instruction sequences are used flag properties of emitted code. The library cannot modify any of the original, undiversified code in-place, as it cannot distinguish between regular code and these placeholders. Even if the compiler never reads back the former, it may read back and validate the contents of the latter, then crash or execute incorrectly. The library preserves the undiversified code, as originally emitted by the compiler.

In some embodiments POSIX signals are preserved. Some JIT compilers (such as HotSpot) intercept POSIX signals and install their own handlers. In some embodiments the SIGSEGV signal is intercepted to catch execution and write attempts on undiversified code, but all other signals (including SIGSEGV signals not handled) are passed back to the JIT compiler.

Some embodiments utilize a control flow graph in which a block is a maximal continuous run of instructions, so that the block ends in an unconditional branch instruction, but contains no such instruction inside. Some embodiments also break blocks at function calls (the CALL instruction) and returns, but not at conditional branches; a basic block can have one or more conditional branches inside, and in some embodiments the block is not split at these branches. However, one heuristic which may be used to split blocks is that whenever a block contains a number of consecutive zeroes over a given threshold, the block is broken after a small number of those zeroes. This is preferred because compilers sometimes emit code only partially (or lazily), initializing the remainder with zeroes. The compiler emits the rest of the code at a later moment, after some event triggers generation of the missing code. This heuristic may be used, for example, to support the V8 compiler, which uses lazy code generation.

Many JIT compilers perform garbage collection on generated code, discarding unused code and reusing that space for new code. The compiler will write and later execute this new code in place of the old version. This may happen frequently in some JIT compilers. In some embodiments such changes are detected, the diversified versions of old blocks are discarded, the new blocks are read and integrated into the existing control flow graph. To detect all changes to a block, librando marks it read-only after diversification using the mprotect function on Linux. If the compiler writes to the block later, the library allows the write to succeed, but marks the block as dirty.

Figure 7:
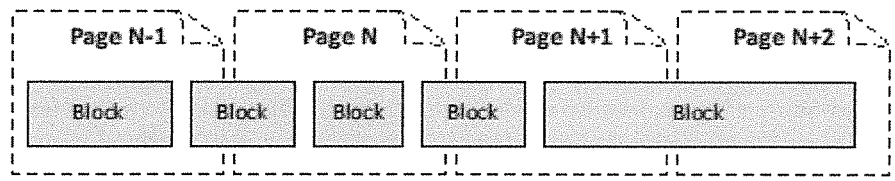
FIG. 7 shows examples of blocks and page boundaries.

The mprotect function has one significant restriction: it can only change access rights on zones aligned to hardware pages; on x86, a page is 4096 bytes by default. There are several issues to consider when using mprotect to protect a block. First, a single page may contain more than one block. Second, a block may be spread across several consecutive pages. Third, for each page, one or two blocks might cross its boundaries, one at each end. FIG. 7 shows examples of all three cases. Instead of marking a block as read-only, librando actually marks all pages containing that block as read-only. However, those pages may contain other blocks that the compiler might never modify.

Figure 8:
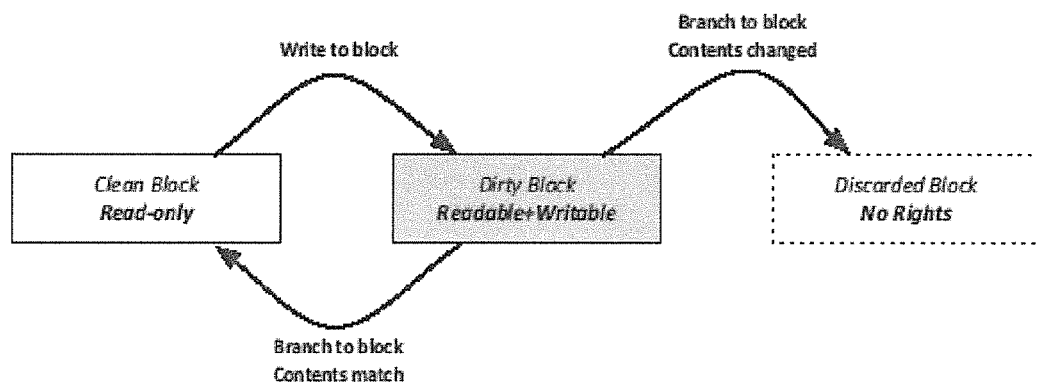
FIG. 8 shows a per block FSM.

After librando marks a page as read-only, the operating system starts notifying the library of all writes to read-only pages. We also use POSIX signals to receive these notifications. The operating system calls the SIGSEGV signal handler each time a processor instruction tries to write to a protected page, as long as the page is protected. However, this occurs before the actual instruction writes the data; we have to either emulate the instruction itself (while keeping the page read-only), or make the page writable and allow the original instruction to execute. As emulating x86 instructions correctly requires significant development effort, the latter solution is used in various embodiments. However, once writes are allowed to a page, there is no way to catch each write to that page separately; the processor will allow all writes to succeed without generating a page fault. At this point, the only information available to librando is that at least one byte in that page may have been modified, but nothing more. Therefore, various embodiments mark all blocks contained in a writable page as dirty. The next time librando intercepts a branch to undiversified code, it checks all dirty blocks to verify that the VM has actually modified their contents. The library only discards and re-diversifies changed blocks, keeping unchanged blocks as they are. FIG. 8 shows this process per block, in the form of a finite state machine.

To check whether a block has been modified, the library compares the new contents of the block against its original contents. However, this requires that two copies of each block be stored: the original and current code. To save memory space, some embodiments do not store both copies in memory; instead, each block stores a hash code of its original contents. Every time librando checks if a block has been modified, it hashes the current contents of the block and compares the hash code to the one stored in the block. If the hash codes match, librando assumes that the block has not been changed; otherwise, it discards the block. While there is a very small possibility of collision (where the contents of a block change, but the hash remains the same), we performed all our experiments and benchmarks successfully with this optimization. In some embodiments a librando user has the option of disabling hashing and verifying the entire contents of blocks, which assists in guaranteeing correctness.

Librando may be attached to a JIT compiler in one of several ways: either by linking it (statically or dynamically) to the compiler, or through the LD_PRELOAD environment variable on Linux. The latter mechanism preloads a library into a process at program start-up time, allowing the library to override some of the program's symbols.

The main security benefits from librando may come from rewriting the generated code. Rewriting may be accomplished in several way. In some embodiments two rewriting techniques that harden the generated code against attacks are used.

In some embodiments NOP Insertion is performed. Code reuse attacks rely on the code having predictable location (address) and contents. We implement, in some embodiments, one fine-grained instruction-level code layout randomization technique: NOP insertion. To randomize code layout, we randomly insert NOP instructions (instructions without effects) into the diversified blocks, between the existing instructions. This technique has been used successfully in other work to change instruction or block alignment to improve performance, security, or provide contention mitigation. NOP insertion pushes each proper instruction forward by a random offset (the total length of all preceding inserted NOPs), making the location of each instruction more difficult to predict. Since the total length of NOPs accumulates as more instructions are added, uncertainty of code addresses increases as more code is generated. This technique makes it difficult for an attacker to predict not only addresses of known code, but also distances between known locations. The attacker might try to learn the address of some known code object, and access all other code relatively to this address. This requires that the attacker know relative locations of code in advance; NOP insertion makes this much less likely, since NOPs displace instructions randomly. If the attacker somehow gets hold of the run-time address of a known instruction (through some form of information disclosure attack), they cannot rely on knowing in advance where the rest of the code is relative to this base address.

Some embodiments implement the algorithm (shown in Algorithm 1) as a single linear-time pass over the instructions in each block. After each proper instruction, the processor implementing the algorithm decides whether to insert a NOP or not by coin toss. In some embodiments the probability of NOP insertion is set to p=0.5, but this can be adjusted for better performance or more security. If the algorithm inserts a NOP, the next step picks a NOP randomly from a set of candidates. Some embodiments use the smallest three NOP instructions from the set of canonical NOPs recommended by the Intel architecture manual.

Figure 9:
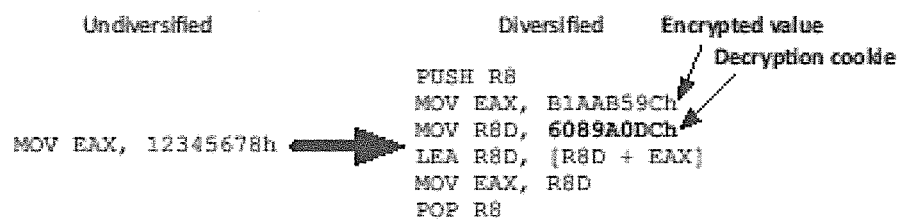
FIG. 9 shows an example of blinding on immediate operand.

Some embodiments use Constant Blinding. JIT spraying as an example of a code injection attack against JIT compilers was discussed above. In general, these attacks rely on the compiler emitting native code that contains some binary sequence from the source-program as-is. In the particular case of JIT spraying, this sequence is a set of 32-bit constants emitted as immediate operands to x86 instructions. Recently, JavaScript compilers have started to implement their own defensive measures particular to this attack. There are two ways that a HLL program value winds up in the executable code region: the compiler stores the value either close the code (without executing it as code), or as an immediate instruction operand. In the former case, NOP insertion shifts the location of the value by a random offset, making its location hard guess. For the latter case, there is one simple solution based on obfuscation: emit each immediate operand in an encrypted form, then decrypt its value at run-time using a few extra instructions. Some embodiments pick a random value (a cookie) for every operand, blind the operand using the cookie, emit the original instruction with the blinded immediate, then emit the decryption code. While other implementations use an XOR operation for encryption, doing so alters the arithmetic flags, so librando would have to save them. Fortunately, the processor provides an addition instruction that leaves the flags intact: LEA. Therefore, some embodiments blind the original value by subtracting the cookie from it, then add an immediate-operand LEA to add the cookie back. FIG. 9 shows an example of this transformation.

The x86 architecture supports 8-, 16-, 32- and 64-bit immediate values for many instructions. Only the latter two types are generally encountered in most code of interest, so only these sizes are implemented in some embodiments; the others can be trivially added. For example, for some systems there is only a single instruction that accepts a 64-bit immediate (the REX.W+B8 encoding of MOV). Every time librando encounters one of these instructions, it transforms the instruction to the equivalent encrypted sequence. Some embodiments implement different blinding code manually for each type of instruction.

Intercepting branches to all generated code and rewriting their contents has a cost in program performance. Several optimizations may be used to reduce this cost.

Some embodiments use a Return Address Map. One of the restrictions of some embodiments is transparency of the native stack. Even when executing diversified code, the native stack preferably has the same contents as it would have under undiversified code. Some embodiments rewrite call instructions to push undiversified return addresses on the stack, as shown in FIG. 6. However, this has one significant drawback: the later RET matching the replaced call pops the undiversified address and branches to it. Since this address is now non-executable, this generates a page fault and a call to the signal handler. As the SIGSEGV handler called after the processor interrupts the execution of another instruction, the operating system saves a lot of processor state before calling the handler; this makes signal handlers very slow. For this reason, RET instructions in diversified code are also expensive.

Figure 10:
FIG. 10 shows rewriting of a RET instruction

To improve performance, the SIGSEGV handler is prevented from being triggered. Embodiments rewrite return instructions, adding code to handle the case when the return address in undiversified code that also has a corresponding diversified address. In as few instructions as possible, the diversified RET instruction now looks for the return address in a data structure that maps undiversified to diversified addresses (this data structure may be called the Return Address Map). If an entry is found, execution continues in diversified code; otherwise, the original address is used as-is. FIG. 10 shows how this optimization rewrites the RET instruction.

Some embodiments store the address mapping in a hash map. Some embodiments use a data structure that supports three operations: lookup, insertion and removal. The library adds the addresses of a block to the map whenever it diversifies the block, then removes the addresses when it discards the block. One significant factor in the choice of data structure is that lookups are far more frequent than the other operations (every RET performs a lookup), so the data structure implementation preferably performs the former as efficiently as possible. Some embodiments use a cuckoo hash map for this goal, as it provides both fast constant-time lookups (we implemented a lookup function in 28 lines of assembly code) and good memory utilization.

As returns are essentially just indirect branches (a pop followed by a branch to the popped value), some embodiments use this data structure to optimize all other indirect branches. Some embodiments extend the map to all basic block addresses (not just return addresses), then prepend hash map lookups to all branches with unknown targets (where the target is not a direct address, but one loaded from a register or memory).

Some embodiments use White Box Diversification. With the Return Address Map handling all diversified-to-diversified-code indirect branches, and the rewriting of all direct branches to target diversified code, the signal handler only intercepts branches entering or exiting the diversified code (mainly the compiler and the language runtime). Some HLL programs make many calls to the runtime (either explicitly as function calls, or implicitly through language features or inline caches), so the overhead from the signal handler remains significant. This overhead is difficult to reduce without making changes to the compiler itself, so the next step in optimization is white box diversification. Under this model, librando provides an interface to the compiler, which the latter uses to notify the former of branches to generated code, with the goal of avoiding the signal handler. JIT compilers frequently have one or a few centralized places in their source code that all jumps to generated code pass through; by manually inserting calls to librando in these few places, one can significantly reduce the overhead of compiler-to-undiversified-code jumps. For example, a single function in V8 (called FUNCTION_CAST) returns the memory address of a JavaScript function; by inserting a single line that calls librando from FUNCTION_CAST, one can completely intercepted all indirect jumps and function calls from V8 to generated code.

In many cases, functions in the language runtime are implemented in a host language such as C; generated code calls these functions directly (using the CALL instruction), and control flow returns from the runtime to generated code not through explicit branches, but through function returns. A host language compiler (gcc, for example) generates these returns automatically, so we cannot manually insert calls to librando for all of them. Also, programs written in a higher-level language usually do not have direct access to the native stack, so they cannot change the return address through host language code. For this reason, in some embodiments a compiler-level extension for LLVM adds a new function attribute —rando_hash_return. The compiler adds calls to librando at the return sites of all functions marked with this attribute; whenever such a function returns, librando checks whether the function returns to undiversified code or not. As there is no automatic analysis that can determine whether a runtime function is called from the runtime or not, the librando user generally has to find all functions that can be called from generated code and manually add this flag to all of them.

Table 1 of FIG. 11 shows the two operations that librando provides to the compiler. Using only this small API, most (if not all) invocations of the signal handler disappear.

Librando provides a framework for intercepting and securing dynamically-generated code. While in some embodiments the library only supports two randomization techniques, others may be used in various other embodiments. Other randomizations could access the code during rewriting through an API, enhancing security against current and new attacks as needed. Examples of other randomizations include address randomization, basic block reordering, equivalent instruction substitution, register re-allocation, instruction reordering, and JIT compiler protection.

On current operating systems, ASLR guarantees that addresses returned by mapping functions (mmap and similar) are randomized. However, this requires that ASLR is supported and enabled on the system. In many cases, it is possible for the program (or librando) to ask for a mapping at a specific address, instead of letting the operating system pick the address. By asking for a randomized address, librando can add address randomization even on systems where ASLR is not enabled (some systems also allow for ASLR to be disabled on a per-program basis, so librando could be used only on those programs).

The diversifier can emit basic blocks in any order (although some orders have better performance than others, due to spatial locality). While some embodiments impose no order on the blocks, the implementation can be extended to explicitly reorder blocks randomly. This randomization would be complementary to address randomization and NOP insertion; the former randomizes the location of the entire executable region of code, basic block reordering would reorder blocks inside the region and NOP insertion would randomize instructions inside each block. The techniques would operate at different levels of granularity to provide even more randomization of the location of an instruction.

The x86 instruction set has several possible encodings for some of the most used instructions. Randomly replacing some of these encodings with equivalent ones changes the code without changing its behavior. In other cases, it is possible to change one or more instruction with an equivalent sequence of other instructions, while also maintaining behavior. Making such changes has a similar effect on security as NOP insertion.

Register operands are encoded inside one or more bytes of an x86 instruction. By randomizing the registers allocated to program values, librando can randomize instruction encoding further. However, this requires a dataflow analysis stage to identify the unique values stored in physical registers and their live ranges.

As an alternative (or complement) to inserting NOPs, some embodiments reorder the instructions of each basic block. However, this requires that all dataflow dependencies are preserved; an instruction that generates a value cannot be moved after instructions that use the value. This requires running an algorithm to determine all data dependencies.

One way of improving JIT compiler security is manually adding security checks and diversity by modifying the compiler.

One example difference that sets librando apart from other rewriters is the limited scope of code rewriting: in various embodiments librando only intercepts and rewrites dynamically generated code. In some embodiments librando is only meant to diversify code which ahead-of-time diversification solution cannot protect. Our approach allows the JIT compiler and language runtime to run natively, only intercepting dynamically generated code.

Randomization, on the other hand, does not assume safety of the defense itself; instead, the goal is to restrict any successful attack to only a small subset of possible targets.

The foregoing discusses librando, a binary rewriting library that hardens JIT compilers, and generally any software that generates new code at run-time, against attacks. The library supports randomization of code from a JIT compiler without requiring any internal changes to the compiler. This approach is generally portable to any existing or new compiler, providing increased security while saving man-months or -years of development effort; instead of having to redo the effort of implementing security measures on every JIT, developers may opt to use our library to secure their compiler. The library can also be used as an interim measure, providing security at a temporary performance penalty until security measures are implemented more efficiently in the compiler itself. In cases where compiler source code is not available, or where recompilation and reinstallation are not feasible, this penalty is preferable to the loss in security. If compiler source code is available, compiler developers can improve diversification performance through white box diversification, by adding calls from the compiler to librando. Some embodiments include an optimization with substantial impact on performance: the Return Address Map.

Although the invention has been discussed with respect to various embodiments, it should be recognized that the invention comprises the novel and non-obvious claims supported by this disclosure.

The invention claimed is:

1. A processor-implemented method useful in hardening just-in-time (JIT) compilers, comprising:
receiving emitted dynamically generated code from a JIT compiler;
preventing execution of the emitted dynamically generated code by setting memory to which the emitted dynamically generated code is written to non-executable;
disassembling at least some bytes of the dynamically generated code;
creating a control flow graph for the disassembled bytes of the dynamically generated code;

diversifying at least some basic blocks of the disassembled dynamically generated code wherein the at least some basic blocks of the dynamically generated code which are diversified are basic blocks in the control flow graph; and writing the diversified basic blocks to an executable area of memory.

2. The method of claim 1, further comprising redirecting branches to the dynamically generated code to the diversified basic blocks.

3. The method of claim 1, wherein the basic blocks are diversified using no operation (NOP) instructions.

4. The method of claim 1, further comprising marking pages of memory, to which the emitted dynamically generated code which has been diversified was written, as read-only.

5. The method of claim 4, further comprising allowing writes to the marked pages, determining changes to the written marked pages, and diversifying at least some changed basic blocks of the written marked pages.

6. The method of claim 1, wherein a basic block is a continuous run instructions ending in an unconditional branch instruction.

7. The method of claim 1, further comprising receiving a signal that an attempt was made to execute instructions in the memory to which the emitted dynamically generated code was written, and redirecting execution to the diversified basic blocks in the executable area of memory.

8. The method of claim 7, wherein the signal is a signal from an operating system indicating an error in operation.

9. The method of claim 8, wherein redirecting execution to the diversified basic blocks in the executable area of memory is performed by an error exception handler.

10. The method of claim 8, further comprising rewriting at least some return instructions in diversified basic blocks to continue execution at a return address specified in the data structure mapping undiversified return addresses to diversified return addresses.

11. The method of claim 1, further comprising receiving a signal indicative of a request to execute emitted dynamically generated code, and directing execution to the diversified basic block in the executable area of memory.

12. The method of claim 11, wherein the signal is received from a just-in-time compiler.

13. The method of claim 1, further comprising rewriting at least some call instructions in diversified basic blocks to put undiversified return addresses in a data structure mapping undiversified return addresses to diversified return addresses.

14. Non-transitory computer readable medium including program instructions which configure a processor to:
 disassemble at least some bytes of dynamically generated code emitted by a just-in-time (JIT) compiler executing on the processor;
 generate a control flow graph based on the disassembled bytes;
 diversify basic blocks present in the control flow graph;
 write the diversified basic blocks to executable memory; and
 disable execution of instructions in memory storing the dynamically generated code emitted by the JIT compiler.

15. The computer readable medium of claim 14, wherein the program instructions further include program instructions to receive a signal indicative of a request to execute the dynamically generated code emitted by the JIT compiler, and to execute the diversified basic blocks in place of the dynamically generated code emitted by the JIT compiler.

16. The computer readable medium of claim 15, wherein the signal is a signal from an operating system.

17. The computer readable medium of claim 15, wherein the signal is a signal from the JIT compiler.

18. A processor-implemented method useful in hardening just-in-time (JIT) compilers, comprising:
 receiving emitted dynamically generated undiversified code from a JIT compiler;
 diversifying at least some basic blocks of the dynamically generated undiversified code from the JIT compiler to obtain diversified code;
 writing the diversified code to executable memory;
 using a data structure mapping addresses of the undiversified code to the diversified code;
 redirecting branches to the at least some basic blocks of the dynamically generated undiversified code to the diversified code.

19. The method of claim 18, wherein addresses are added to the data structure upon diversification of the at least some basic blocks of the dynamically generated undiversified code.

* * * * *